US012580703B2

(12) United States Patent
Liu et al.

(10) Patent No.: US 12,580,703 B2
(45) Date of Patent: Mar. 17, 2026

(54) METHODS AND APPARATUSES FOR INFORMATION TRANSMISSION AND INFORMATION RECEPTION

(71) Applicant: NEC CORPORATION, Tokyo (JP)

(72) Inventors: Hongmei Liu, Beijing (CN); Lei Jiang, Beijing (CN); Gang Wang, Beijing (CN)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 18/425,889

(22) Filed: Jan. 29, 2024

(65) Prior Publication Data

US 2024/0171338 A1     May 23, 2024

Related U.S. Application Data

(63) Continuation of application No. 16/319,031, filed as application No. PCT/CN2016/090698 on Jul. 20, 2016, now Pat. No. 11,916,819.

(51) Int. Cl.
*H04L 5/00*         (2006.01)
*H04L 1/00*         (2006.01)
(Continued)

(52) U.S. Cl.
CPC .......... *H04L 5/0048* (2013.01); *H04L 1/0079* (2013.01); *H04L 5/005* (2013.01);
(Continued)

(58) Field of Classification Search
USPC ....... 370/229, 230, 236, 252, 324, 328, 329, 370/330, 350, 503
See application file for complete search history.

(56) References Cited

U.S. PATENT DOCUMENTS

2012/0039180 A1\*  2/2012  Kim ...................... H04L 5/0053
                                                                      370/241
2012/0170458 A1\*  7/2012  Zee ....................... H04L 5/0048
                                                                      370/232
(Continued)

FOREIGN PATENT DOCUMENTS

CN         102056316 A      5/2011
CN         104968052 A     10/2015
(Continued)

OTHER PUBLICATIONS

MediaTek Inc., "Enhanced DRS Design for LAA", 3GPP TSG RAN WG1 Meeting #82b, R1-156057, Malmo, Sweden, Oct. 5-9, 2015, 8 pages total.
(Continued)

*Primary Examiner* — Nguyen H Ngo
(74) *Attorney, Agent, or Firm* — Sughrue Mion, PLLC

(57)                 ABSTRACT

Embodiments of the present disclosure relate to methods and apparatuses of transmitting information and receiving information in a wireless communication system. In the method of transmitting information, the information comprises at least two of a reference signal and more than one radio resource control (RRC) message. The method comprises transmitting the at least two of the reference signal and the more than one RRC message by using a same time unit or at least two continuous time units, wherein the at least two of the reference signal and the more than one RRC message have a same time offset or different time offsets and have a same transmission periodicity or transmission periodicities which are different multiples of a predetermined periodicity. Thus, the interference to other systems or nodes can be limited, and the number of LBTs required for these signal transmissions can be reduced if they are transmitted on unlicensed spectrum.

8 Claims, 7 Drawing Sheets

(51) Int. Cl.

| | | |
|---|---|---|
| *H04L 27/00* | (2006.01) | |
| *H04W 16/14* | (2009.01) | |
| *H04W 68/00* | (2009.01) | |
| *H04W 76/27* | (2018.01) | |

(52) U.S. Cl.
CPC ......... *H04L 27/0006* (2013.01); *H04W 16/14* (2013.01); *H04W 68/005* (2013.01); *H04W 76/27* (2018.02); *H04W 68/00* (2013.01)

(56) References Cited

U.S. PATENT DOCUMENTS

| | | | |
|---|---|---|---|
| 2012/0327894 | A1 | 12/2012 | Axmon et al. |
| 2013/0336279 | A1 | 12/2013 | Kim et al. |
| 2014/0050191 | A1 | 2/2014 | Kim et al. |
| 2014/0235243 | A1 | 8/2014 | Damnjanovic et al. |
| 2015/0029928 | A1 | 1/2015 | Yamazaki |
| 2015/0146622 | A1 | 5/2015 | Ren et al. |
| 2015/0257173 | A1 | 9/2015 | You et al. |
| 2015/0296365 | A1 | 10/2015 | Choi et al. |
| 2015/0304932 | A1 | 10/2015 | Wei et al. |
| 2015/0319701 | A1 | 11/2015 | Ng et al. |
| 2015/0334573 | A1 | 11/2015 | Svedman et al. |
| 2016/0135124 | A1 | 5/2016 | Vos et al. |
| 2016/0302090 | A1 | 10/2016 | Parkvall et al. |
| 2016/0338006 | A1* | 11/2016 | Lee ................... H04W 52/0229 |
| 2016/0374109 | A1 | 12/2016 | Rico Alvarino et al. |
| 2017/0048889 | A1* | 2/2017 | Kadous ................ H04W 72/23 |
| 2017/0093542 | A1 | 3/2017 | Li et al. |
| 2017/0135029 | A1 | 5/2017 | Chendamarai Kannan et al. |
| 2017/0230951 | A1 | 8/2017 | Xiong et al. |
| 2017/0257838 | A1* | 9/2017 | Patel ...................... H04H 20/08 |
| 2018/0007667 | A1 | 1/2018 | You et al. |
| 2018/0035372 | A1 | 2/2018 | Pradas et al. |
| 2018/0199308 | A1 | 7/2018 | Liu et al. |
| 2018/0212726 | A1 | 7/2018 | Xue et al. |
| 2018/0227832 | A1 | 8/2018 | Da Silva et al. |
| 2018/0310267 | A1 | 10/2018 | Liu et al. |
| 2019/0191456 | A1 | 6/2019 | Koorapaty et al. |
| 2019/0239277 | A1 | 8/2019 | Liu et al. |

FOREIGN PATENT DOCUMENTS

| | | |
|---|---|---|
| CN | 105101280 A | 11/2015 |
| JP | 2012-104959 A | 5/2012 |
| JP | 2015-84528 A | 4/2015 |
| JP | 2016-1900 A | 1/2016 |
| JP | 2016-52127 A | 4/2016 |
| JP | 2016-510576 A | 4/2016 |
| JP | 2017-532897 A | 11/2017 |
| WO | 2016/021713 A1 | 2/2016 |
| WO | 2016/052017 A1 | 4/2016 |
| WO | 2016/071021 A1 | 5/2016 |

OTHER PUBLICATIONS

Communication dated Apr. 20, 2021, issued in Chinese Patent Application No. 201680087751.9.

CMCC, "Discussion on discovery signal design for LAA", 3GPP TSG RAN WG1 Meeting #82bis, R1-155786, Malmö, Sweden, Oct. 5-9, 2015, 4 pages total.

Notification of Reasons of Refusal dated Apr. 14, 2020, from the Japanese Patent Office in Application on No. 2019-502583.

International Search Report on International Application No. PCT/CN2016/090698, issued on Apr. 17, 2017.

Intel Corporation, "Corrections to MTCe in TS 36.331", 3GPP TSG-RAN WG2 Meeting #94, R2-163352, pp. 1-418 (418 pages total), Nanjing, China, May 23-27, 2016.

Ericsson, Nokia, "New Work Item on Enhancements to LTE operation in unlicensed spectrum", 3GPP TSG RAN Meeting #72, RP-160870, pp. 1-10 (10 pages total) Busan, Korea, Jun. 13-16, 2016.

Communication dated Sep. 8, 2020, issued by the Japanese Patent Office in application No. 2019-502583.

* cited by examiner

100

Transmit the at least two of the reference signal and the more than one RRC
message by using a same time unit or at least two continuous time units,
wherein the at least two of the reference signal and the more than one RRC
message have a same time offset or different time offsets, and
wherein the at least two of the reference signal and the more than one RRC
message have a same transmission periodicity or transmission periodicities
which are different multiples of a predetermined periodicity.

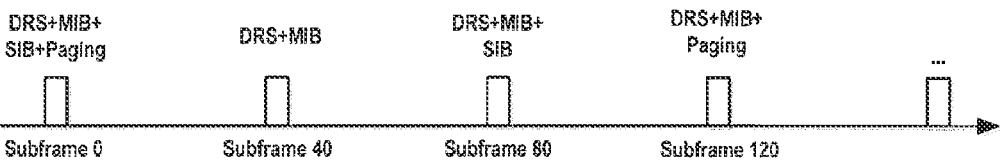

| DRS+MIB+<br>SIB+Paging | DRS+MIB | DRS+MIB+<br>SIB | DRS+MIB+<br>Paging | ... |
|---|---|---|---|---|

Subframe 0        Subframe 40        Subframe 80        Subframe 120

Fig. 2

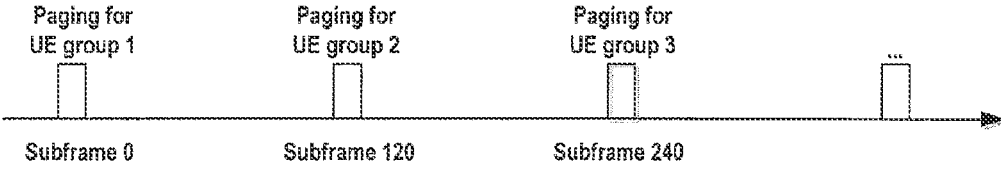

| Paging for<br>UE group 1 | Paging for<br>UE group 2 | Paging for<br>UE group 3 | ... |
|---|---|---|---|

Subframe 0        Subframe 120        Subframe 240

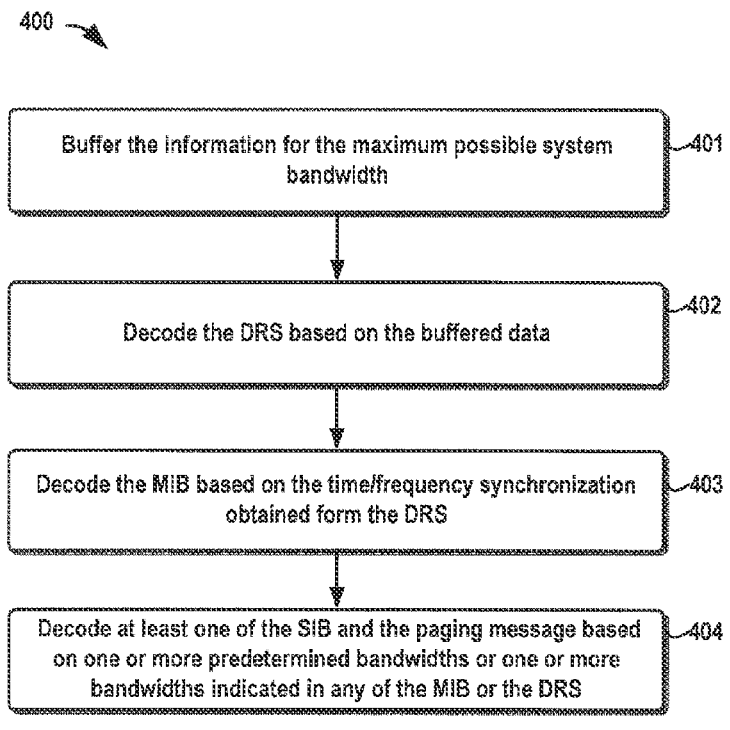

Buffer the information for the maximum possible system bandwidth — 401

Decode the DRS based on the buffered data — 402

Decode the MIB based on the time/frequency synchronization obtained form the DRS — 403

Decode at least one of the SIB and the paging message based on one or more predetermined bandwidths or one or more bandwidths indicated in any of the MIB or the DRS — 404

Fig. 4

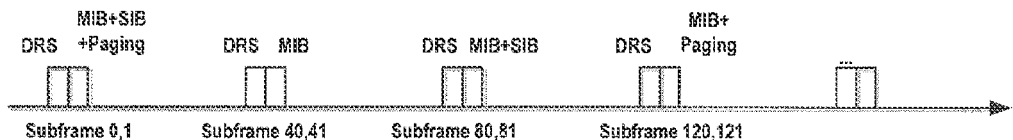

| | MIB+SIB | | | | | | MIB+ | | |
| DRS | +Paging | | DRS | MIB | | DRS | MIB+SIB | DRS | Paging |

Subframe 0,1        Subframe 40,41        Subframe 80,81        Subframe 120,121

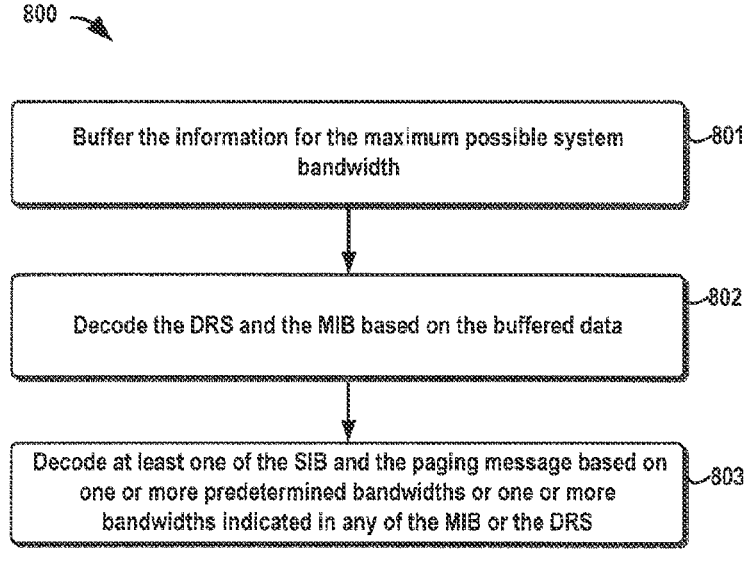

Buffer the information for the maximum possible system bandwidth — 801

Decode the DRS and the MIB based on the buffered data — 802

Decode at least one of the SIB and the paging message based on one or more predetermined bandwidths or one or more bandwidths indicated in any of the MIB or the DRS — 803

Fig. 8

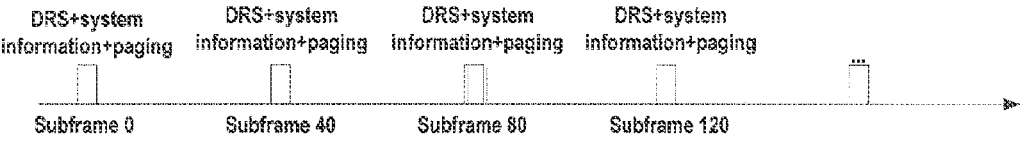

| DRS+system information+paging | DRS+system information+paging | DRS+system information+paging | DRS+system information+paging |
| Subframe 0 | Subframe 40 | Subframe 80 | Subframe 120 |

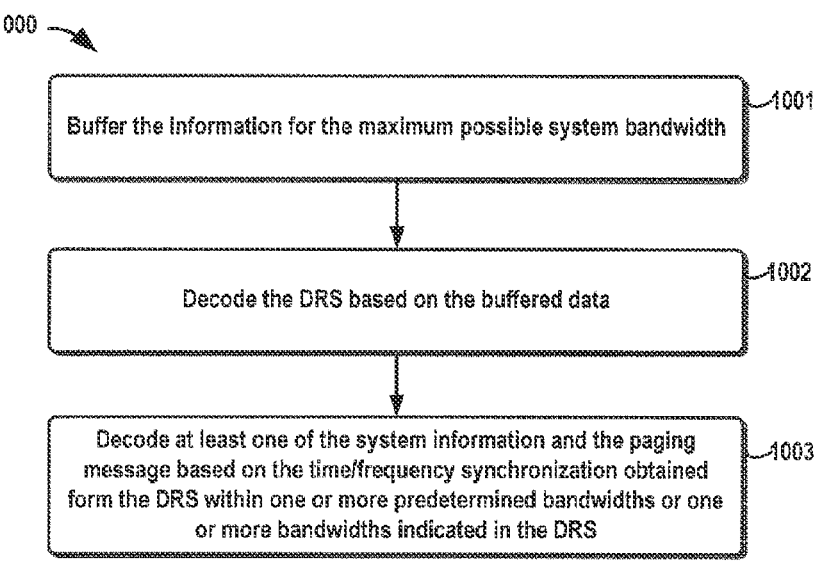

Buffer the information for the maximum possible system bandwidth  1001

Decode the DRS based on the buffered data  1002

Decode at least one of the system information and the paging message based on the time/frequency synchronization obtained form the DRS within one or more predetermined bandwidths or one or more bandwidths indicated in the DRS  1003

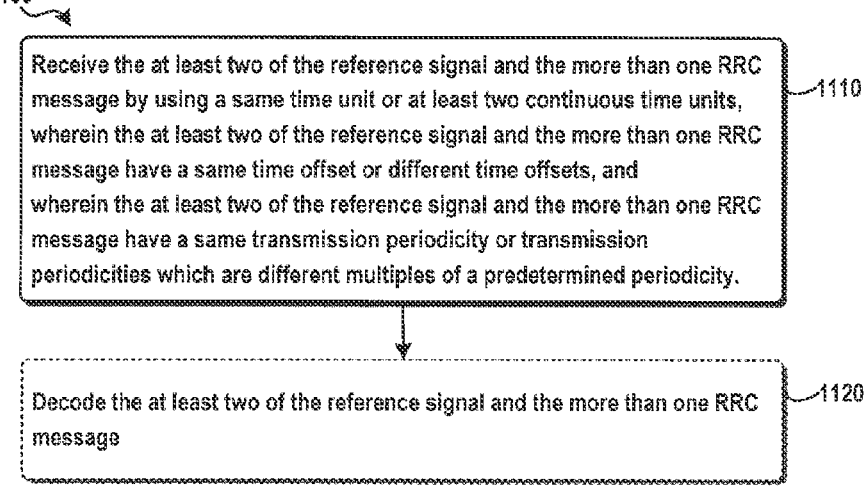

Receive the at least two of the reference signal and the more than one RRC message by using a same time unit or at least two continuous time units, wherein the at least two of the reference signal and the more than one RRC message have a same time offset or different time offsets, and wherein the at least two of the reference signal and the more than one RRC message have a same transmission periodicity or transmission periodicities which are different multiples of a predetermined periodicity.  1110

Decode the at least two of the reference signal and the more than one RRC message  1120

Fig. 11

METHODS AND APPARATUSES FOR INFORMATION TRANSMISSION AND INFORMATION RECEPTION

CROSS REFERENCE TO RELATED APPLICATIONS

This application is a continuation of U.S. application Ser. No. 16/319,031 filed Jan. 18, 2019, which is a National Stage of International Application No. PCT/CN2016/090698 filed Jul. 20, 2016, the disclosures of which are incorporated herein by reference in their entirety.

FIELD OF THE INVENTION

The non-limiting and exemplary embodiments of the present disclosure generally relate to the field of wireless communication techniques, and more particularly relate to a method and apparatus for transmitting information and a method and apparatus for receiving information.

BACKGROUND OF THE INVENTION

With the constant increase of wireless data services, licensed carrier resource is limited and hard to cope with the constantly increasing data traffic. Thus, it is proposed to use unlicensed carrier resource for data transmission, which could provide a large amount of frequency resources in a cost effective way.

Recently, the 3rd Generation Partnership Project (3GPP) organization had started standardization on Licensed-Assisted Access, which introduces the data offloading from the licensed carrier resource to the unlicensed carrier resource on small cells to deliver a data speed boost to terminal devices. For data transmission on the unlicensed carrier, it shall perform a Listen Before Talk (LBT) operation to detect whether the channel is idle. The transmission on the unlicensed carrier can only be performed when the LBT result shows that the channel is idle; otherwise the transmission will not be performed on the unlicensed carrier. Therefore, the transmission opportunity in unlicensed spectrum is limited due to the LBT.

Usually, reference signals (such as a discovery signal (DRS)) and radio resource control (RRC) message (such as system information, paging message, etc.) are both required to be transmitted to terminal devices like user equipment (UE). These signals often have different transmission periodicities and different time offsets and might have some dependency therebetween. For example, the DRS, Mater Information Blocks (MIB), System Information Blocks (SIB), and paging messages in legacy LTE systems have different periodicities and different time offsets, and the DRS/MIB/SIB/paging have dependency among each other. This means that successful decoding of one signal might depend on decoding of another signal and thus UE cannot get full system information if some of the information cannot be received successfully. In such a case, it will impact the user experience substantially. Besides, there might be also an energy consumption issue and inter-node interference issue as well.

In US application publication No. US20160165638A1, there is disclosed a solution for enhanced system access for E-UTRAN, in which a two-stage system information transmission solution and a reduced paging cycle are proposed. Particularly, in this application, in a first stage, first system information common to each cell of a group of cells in an area is broadcasted first; then second system information that can vary between cells in the group is broadcasted; and the second system information is broadcasted more frequently than the first system information.

In technical document RP-160870, New WI: Work Item on Standalone LTE operation and dual connectivity operation in unlicensed spectrum, Ericsson, 3GPP RANP #72 meeting, it discloses a standard LAA to support scheduling DRS, MIB and SIBs in a common subframe.

However, multiple LBT attempts will be still necessary for reference signal and the RRC message transmission on unlicensed spectrum if they are transmitted in different time instances and there might still be interferences to other systems due to these information transmissions.

SUMMARY OF THE INVENTION

In the present disclosure, there is provided a new solution for information transmission and information reception in a wireless communication system, to mitigate or at least alleviate at least part of the issues in the prior art.

According to a first aspect of the present disclosure, there is provided a method of transmitting information in a wireless communication system, wherein the information comprises at least two of a reference signal and more than one radio resource control (RRC) message. The method comprises transmitting the at least two of the reference signal and the more than one RRC message by using a same time unit or at least two continuous time units, wherein the at least two of the reference signal and the more than one RRC message have a same time offset or different time offsets, and wherein the at least two of the reference signal and the more than one RRC message have a same transmission periodicity or transmission periodicities which are different multiples of a predetermined periodicity.

According to a second aspect of the present disclosure, there is provided a method of receiving information, wherein the information comprises at least two of a reference signal and more than one radio resource control (RRC) message. The method comprises receiving the at least two of the reference signal and the more than one RRC message by using a same time unit or at least two continuous time units, wherein the at least two of the reference signal and the more than one RRC message have a same time offset or different time offsets, and wherein the at least two of the reference signal and the more than one RRC message have a same transmission periodicity or transmission periodicities which are different multiples of a predetermined periodicity.

According to a third aspect of the present disclosure, there is provided an apparatus for transmitting information in a wireless communication system, wherein the information comprises at least two of a reference signal and more than one radio resource control (RRC) message. The apparatus comprises an information transmission module configured to transmit the at least two of the reference signal and the more than one RRC message by using a same time unit or at least two continuous time units, wherein the at least two of the reference signal and the more than one RRC message have a same time offset or different time offsets, and wherein the at least two of the reference signal and the more than one RRC message have a same transmission periodicity or transmission periodicities which are different multiples of a predetermined periodicity.

According to a fourth aspect of the present disclosure, there is provided an apparatus of receiving information, wherein the information comprises at least two of a reference signal and more than one radio resource control (RRC) message. The apparatus comprises: an information receiving module configured to receive the at least two of the reference signal and the more than one RRC message by using a same time unit or at least two continuous time units, wherein the at least two of the reference signal and the more than one RRC message have a same time offset or different time offsets, and wherein the at least two of the reference signal and the more than one RRC message have a same transmission periodicity or transmission periodicities which are different multiples of a predetermined periodicity.

According to a fifth aspect of the present disclosure, there is provided a computer-readable storage media with computer program code embodied thereon, the computer program code configured to, when executed, cause an apparatus to perform actions in the method according to any embodiment in the first aspect.

According to a sixth aspect of the present disclosure, there is provided a computer-readable storage media with computer program code embodied thereon, the computer program code configured to, when executed, cause an apparatus to perform actions in the method according to any embodiment in the second aspect.

According to a seventh aspect of the present disclosure, there is provided a computer program product comprising a computer-readable storage media according to the fifth aspect.

According to an eighth aspect of the present disclosure, there is provided a computer program product comprising a computer-readable storage media according to the sixth aspect.

With embodiments of the present disclosure, it provides a new solution for information transmission and receiving, in which the at least two of the reference signal and the more than one RRC message are transmitted using a same time unit or at least two continuous time units. In such a way, all information to be transmitted will be transmitted in the same or near time units and thus the interference to other systems or nodes can be limited, and the number of LBTs required for these signal transmissions can be reduced if they are transmitted on unlicensed spectrum.

BRIEF DESCRIPTION OF THE DRAWINGS

The above and other features of the present disclosure will become more apparent through detailed explanation on the embodiments as illustrated in the embodiments with reference to the accompanying drawings, throughout which like reference numbers represent same or similar components and wherein:

FIG. 1 schematically illustrates a flow chart of a method of transmitting information in a wireless communication system according to an embodiment of the present disclosure;

FIG. 2 schematically illustrates an example information transmission timing according to an example embodiment of the present disclosure;

FIG. 3 schematically illustrates an example paging timing for different UE groups according to an example embodiment of the present disclosure;

FIG. 4 schematically illustrates an example flow chart of information receiving in a wireless communication system according to a specific implementation of the present disclosure;

FIG. 5 schematically illustrates another example information transmission timing according to an example embodiment of the present disclosure;

FIG. 8 schematically illustrates an example flow chart of information receiving in a wireless communication system according to a further specific implementation of the present disclosure;

FIG. 9 schematically illustrates a still further example information transmission timing according to an example embodiment of the present disclosure;

FIG. 10 schematically illustrates an example flow chart of information receiving in a wireless communication system according to a still further specific implementation of the present disclosure;

FIG. 11 schematically illustrates a flow chart of a method of receiving information in a wireless communication system according to an embodiment of the present disclosure;

DETAILED DESCRIPTION OF EMBODIMENTS

Figure 6:
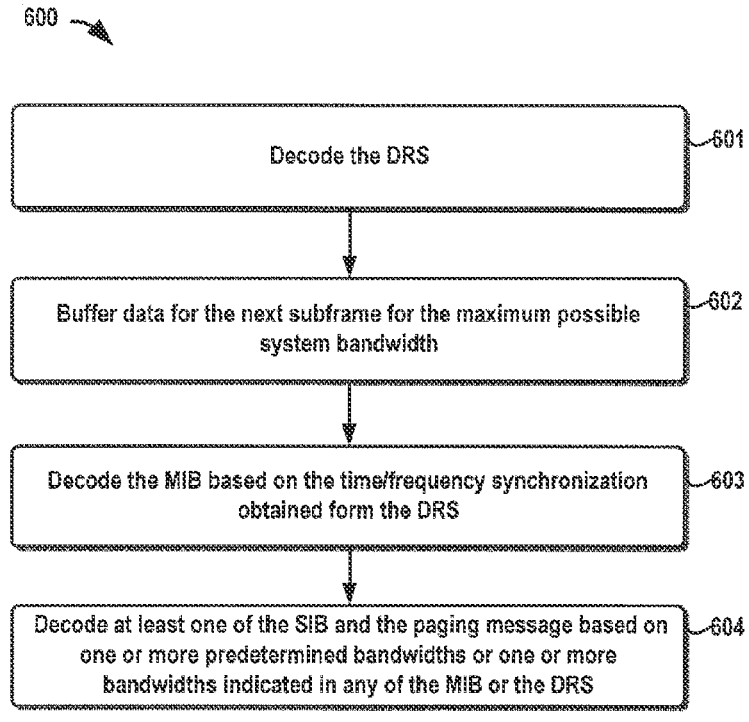
FIG. 6 schematically illustrates an example flow chart of information receiving in a wireless communication system according to another specific implementation of the present disclosure.

Hereinafter, the solution as provided in the present disclosure will be described in details through embodiments with reference to the accompanying drawings. It should be appreciated that these embodiments are presented only to enable those skilled in the art to better understand and implement the present disclosure, not intended to limit the scope of the present disclosure in any manner.

In the accompanying drawings, various embodiments of the present disclosure are illustrated in block diagrams, flow charts and other diagrams. Each block in the flowcharts or blocks may represent a module, a program, or a part of code, which contains one or more executable instructions for performing specified logic functions, and in the present disclosure, a dispensable block is illustrated in a dotted line. Besides, although these blocks are illustrated in particular sequences for performing the steps of the methods, as a matter of fact, they may not necessarily be performed strictly according to the illustrated sequence. For example, they might be performed in reverse sequence or simultaneously, which is dependent on natures of respective operations. It should also be noted that block diagrams and/or each block in the flowcharts and a combination of thereof may be implemented by a dedicated hardware-based system for performing specified functions/operations or by a combination of dedicated hardware and computer instructions.

Generally, all terms used in the claims are to be interpreted according to their ordinary meaning in the technical field, unless explicitly defined otherwise herein. All references to "a/an/the/said [element, device, component, means, step, etc.]" are to be interpreted openly as referring to at least one instance of said element, device, component, means, unit, step, etc., without excluding a plurality of such devices, components, means, units, steps, etc., unless explicitly stated otherwise. Besides, the indefinite article "a/an" as used herein does not exclude a plurality of such steps, units, modules, devices, and objects, and etc.

Additionally, in a context of the present disclosure, a user equipment (UE) may refer to a terminal, a Mobile Terminal (MT), a Subscriber Station (SS), a Portable Subscriber Station (PSS), Mobile Station (MS), or an Access Terminal (AT), and some or all of the functions of the UE, the terminal, the MT, the SS, the PSS, the MS, or the AT may be included. Furthermore, in the context of the present disclosure, the term "BS" may represent, e.g., a node B (NodeB or NB), an evolved NodeB (eNodeB or eNB), a radio header (RH), a remote radio head (RRH), a relay, or a low power node such as a femto, a pico, and so on.

As mentioned hereinabove, in the existing solutions, a reference signal and RRC message transmissions still require multiple LBT attempts and also cause interference to other systems. Thus, in the present disclosure, there is provided a new solution of information transmission and receiving to address these issues. In the present disclosure, it is proposed to transmit the reference signal and the RRC messages together as most as possible so that requirements for the LBT can be reduced and the interference to other systems or nodes can be lowered. Hereinafter, the solution of information transmission and receiving will be described in detailed with reference to the accompany drawings as provided therein.

FIG. 1 schematically illustrates a flow chart of a method 100 of data transmission in a wireless communication system according to an embodiment of the present disclosure. The method 100 can be performed at a serving node, for example a BS, like a node B (NodeB or NB).

As illustrated in FIG. 1, first in step S101, the at least two of the reference signal and the more than one RRC message are transmitted by using a same time unit or at least two continuous time units. Particularly, the at least two of the reference signal and the more than one RRC message may have a same time offset or different time offsets, and wherein the at least two of the reference signal and the more than one RRC message may have a same transmission periodicity or transmission periodicities which are different multiples of a predetermined periodicity.

In embodiments of the present disclosure, the reference signal may include any of, for example, a discovery signal, a cell reference signal (CRS), channel status information reference signals (CSI-RS), a primary synchronization signal (PSS), a secondary synchronization signal (SSS), or any other kind of reference signal.

In embodiments of the present disclosure, the RRC message may include any of RRC information elements, security control information elements, mobility control information elements, measurement information elements, other information elements, Multimedia Broadcast Multicast Service (MBMS) information elements, Single Cell-Point To Multipoint (SC-PTM) information elements, sidelink information elements, system information blocks (SIB), master information blocks (MIS), paging message and other RRC messages newly defined in the future.

Hereinafter, only for illustrations, the DRS and the MIB, the SIB and the paging message will be described as the example of the reference signal and the RRC message respectively; however, the skilled in the art shall be noticed that the present disclosure is not limited to these specific embodiments and it can be applied any other kind of the reference signal and RRC message as well.

In the present disclosure, it is proposed to transmit the at least two of the reference signal and the more than one RRC message in the same time unit or transmitted in two or more continuous time units. It shall be noticed that the transmitting in the same time unit or in the continuous time units does not mean they are always transmitted in the same subframe or continuous time units but means if any of these information needs to be sent, they will be sent in the same subframe or continuous time units. In other words, the reference signal and the RRC message can be transmitted in the same or near subframes as most as possible to reduce interference to other networks or systems and reduce requirements for the LBT. The time unit used herein may include for example, subframe or any other suitable time unit.

The periodicities of the reference signal and the RRC message have a same transmission periodicity or transmission periodicities which are different multiples of a predetermined periodicity and their time offsets can be the same or different. Different combinations of the periodicities and the time offsets can result in different transmission timings for these information. Several examples of transmission timings will be described in the following context.

Next, reference is made to FIG. 2 which schematically illustrates an example information transmission timing according to an example embodiment of the present disclosure. In the embodiment of the present disclosure, the DRS, the MIB, the SIB, and the paging message have the same periodicities as those of the legacy systems, i.e., the DRS and MIB have a periodicity of 40 ms, the SIB has periodicity of 80 ms and the paging message has a periodicity of 120 ms. In other word, they have periodicities which are different multiple of a predetermined periodicity of 40 ms.

In illustrated figure, the MIB, the SIB, and the paging message are transmitted within the same time unit (such as subframe) with the DRS and they have the same time offset, which means they will be transmitted in the same one subframe if any of them are transmitted. As illustrated, the DRS, the MIB, the SIB and the paging message are transmitted in subframe 0, the DRS and the MIB are transmitted in subframe 40, the DRS, the MIB and the SIB are transmitted in subframe 80 and the DRS, the MIB and the paging message are transmitted in subframe 120.

In an embodiment of the present disclosure, the paging periodicity may be larger than that of the DRS so that paging messages for different UE can be carried at different DRS occasions. Only as an example, different DRS subframes can be assigned to different UE for carrying paging messages based on the UE's identifiers, for example, the UE's International Mobile Subscriber Identification Number (IMSI) or any other suitable identifier. Thus, the available time domain resource for the paging message is restricted to the DRS subframes, i.e., subframes carrying the DRS, instead of all subframes.

FIG. 3 schematically illustrates an example paging timing for different UE groups according to an example embodiment of the present disclosure. As illustrated in FIG. 3, UE is divided, based on identifiers for example IMSI, into different UE groups, including UE group 1, UE group 2, UE group 3, etc. For UE in UE group 1, the paging messages are transmitted in subframe 0, for UE in UE group 2, the paging messages are transmitted in subframe 120; UE in UE group 3, the paging messages are transmitted in subframe 240.

Thus UE in different UE groups can receive the paging message in DRS subframes determined based on their IMSIs.

In an embodiment of the present disclosure, the MIB can be carried by for example, Physical Broadcast Channel (PBCH) or any other suitable channels. In another embodiment of the SIB can be carried by, for example, Physical Downlink Shared Channel (PDSCH) (or any other suitable channels) with common search space Physical Downlink Control Channel (PDCCH) (or any other suitable channels) scrambled by System Information-Radio Network Temporary Identifier (SI-RNTI) or any other suitable identifier. In a further embodiment of the present disclosure, the paging message can be carried by, for example, PDSCH (or any other suitable channels) with common search space PDCCH (or any other suitable channels) scrambled by Paging-RNTI (P-RNTI) or any other suitable identifier.

In one embodiment of the present disclosure, the SIB/paging system bandwidth can be predetermined in the LTE specification, or alternatively be carried by the MIB. Additionally or alternatively, it may further consider using the MIB to carry SIB timing configuration information. Further additionally or alternatively, it is also possible to use the MIB to indicate some DRS bandwidth if there are additional DRS like enhanced DRS in addition the basic DRS.

FIG. 4 illustrates an example flow chart of receiving information in accordance with a specific implementation of the present disclosure. The method 400 can be performed at a terminal device, for example UE, or other like terminal devices. It shall be noticed that although the example flow chart is mainly described in a case that the MIB/SIB/Paging message are transmitted with the DRS in the same subframe, the present disclosure is not limited thereto and it can also be combined with other cases.

As illustrated in FIG. 4, in step 401, the UE buffers the received data for the maximum possible system bandwidth, for example 20 MHz. Then in step 402, the UE blind decodes the DRS based on the buffered data within one or more predefined bandwidths. The predefined bandwidth can for example be defined in a specification like LTE specification, for example central 6RB. If the DRS are successfully decoded, the time/frequency synchronization information can be obtained. Thus, in step 403, based on the obtained time/frequency synchronization information, the UE decodes the corresponding MIB within another one or more predetermined bandwidth or another one or more bandwidths as indicated in the DRS. In step 404, if the bandwidth for the SIB and paging message is predetermined, at least one of the SIB and the paging message can be decoded in further one or more predetermined bandwidths. In such a case, steps 403 and 404 can be performed in a different order, for example in a reverse order or performing in parallel. In a case that bandwidth is indicated in any of the MIB and the DRS, the at least one of the SIB and the paging message can be decoded within further one or more bandwidths as indicated in at least one of the MIB and DRS after this information is obtained therefrom.

In a further embodiment of the present disclosure, for cell differentiation, different time offsets can be utilized for orthogonally. That is to say, the paging information received by UE is transmitted in a time unit, for example predetermined based on an identifier of the cell serving the UE.

In another embodiment of the present disclosure, the at least two of the reference signal and the more than one RRC message are grouped into at least two groups and the information within these at least two groups will be respectively transmitted in the at least two continuous time units.

Information in a same one group has a same time offset and has a same transmission periodicity or transmission periodicities which are different multiples of a predetermined periodicity. Thus, in the other embodiment, the at least two continuous time units will be transmitted within two or more continuous time units and the reference signal and the more than one RRC message will be assigned to these time units. Information in the same one group will be set as having the same offset so that they can be transmitted in the same time unit.

FIG. 5 schematically illustrates example information transmission timing according to an example embodiment of the present disclosure. In the embodiment, the DRS, the MIB, the SIB, and the paging message have the same periodicities as those of the legacy systems, i.e., the DRS and MIB have a periodicity of 40 ms, the SIB has periodicity of 80 ms and the paging message has a periodicity of 120 ms. However, they are transmitted within two continuous subframes and their offsets are adjusted to consider the DRS time domain position. In the FIG. 5, the DRS belongs to a first signal group and the MIB, the SIB and the paging message belong to a second signal group, the first signal group and the second signal group are respectively transmitted in two adjacent subframes. As illustrated in FIG. 5, for adjacent subframes 0 and 1, the DRS is transmitted in subframe 0 and the MIB, the SIB and the paging information are transmitted in the subframe 1; for adjacent subframes 40 and 41, the DRS is transmitted in subframe 40 and the MIB is transmitted in subframe 41; for adjacent subframes 80 and 81, the DRS is transmitted in subframe 80 and the MIB and the SIB are transmitted in subframe 81; for adjacent subframes 120 and 121, the DRS is transmitted in subframe 120 and the MIB and the paging information are transmitted in subframe 121. Thus, it is clear that in this embodiment, the DRS is separately transmitted in a subframe, and at least two of the MIB and SIB and the paging message are transmitted in a following subframe.

In this embodiment, the carrying of MIB, SIB, paging message, the SIB/Paging bandwidth indication and the cell differentiation can be similar to those described with reference to FIGS. 1 and 2 and thus will not be elaborated herein for simplification purposes.

FIG. 6 illustrates an example flow chart of receiving information in accordance with another specific implementation of the present disclosure. The method 600 can be performed at a terminal device, for example UE, or other like terminal devices. It shall be noticed that although the example flow chart is mainly described in a case that the DRS, the MIB/SIB/Paging message are transmitted in two continuous and the DRS is transmitted separately, it can also be combined with other cases.

As illustrated in FIG. 6, different from FIG. 4, in step 601, the UE first blind decodes the DRS within a predefined bandwidth. The predefined bandwidth can for example be defined in a specification like LTE specification, for example central 6RB. Then in step 602 the UE buffers the received data in the next subframe for the maximum possible system bandwidth, for example 20 MHz. If the DRS is successfully decoded, the time/frequency synchronization information can be obtained. Thus, in step 403, based on the obtained time/frequency synchronization information and the buffered data, the UE decodes the corresponding MIB within another predetermined bandwidth or another one or more bandwidths as indicated in the DRS. In step 604, if the bandwidth for the SIB and paging message is predetermined, at least one of the SIB and the paging message can be decoded in the one or more predetermined bandwidths. In such a case, the step 603 and 604 can be performed in a different order, for example in a reverse order or performing in parallel. In a case that the bandwidth for the SIB and paging message is indicated in any of the MIB and the DRS, the at least one of the SIB and the paging message can be decoded within further one or more bandwidths as indicated in at least one of the MIB and DRS after this information is obtained therefrom.

Figure 7:
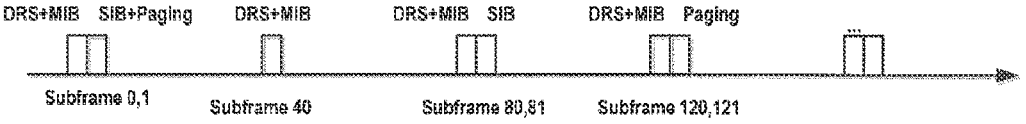
FIG. 7 schematically illustrates a further example information transmission timing according to an example embodiment of the present disclosure.

FIG. 7 further schematically illustrates another example information transmission timing according to an example embodiment of the present disclosure. In the embodiment, the DRS, the MIB, the SIB, and the paging message have the same periodicities as those of the legacy systems, i.e., the DRS and MIB have a periodicity of ms, the SIB has periodicity of 80 ms and the paging message has a periodicity of 120 ms. These signals are transmitted within two continuous subframes and their offsets are adjusted to consider the DRS time domain position. Different from that in FIG. 5, the DRS and the MIB are divided into a first signal group and the SIB and the paging message are divided into a second signal group. As illustrated in FIG. 7, for adjacent subframes 0 and 1, the DRS and MIB are transmitted in subframe 0 and the SIB and the paging information are transmitted in the subframe 1; for subframe 40, the DRS and MIB are transmitted in subframe 40; for adjacent subframes 80 and 81, the DRS and the MIB are transmitted in subframe 80 and the SIB is transmitted in subframe 81; for adjacent subframes 120 and 121, the DRS and the MIB are transmitted in subframe 120 and the paging information is transmitted in subframe 121. Thus, it is clear that in this embodiment, the DRS and the MIB are transmitted in the same subframe, and the SIB and the paging message are transmitted in the following subframe if they are required to be transmitted. In other word, the timing as illustrated in FIG. 7 is different from that illustrated in FIG. 5 in a different division of the reference signals and the RRC messages in two continuous subframes.

In this embodiment, the carrying of MIB, SIB, paging message, the SIB/Paging bandwidth indication and the cell differentiation can be similar to those described with reference to FIGS. 1 and 2 as well and thus will not be elaborated herein for simplification purposes.

FIG. 8 illustrates an example flow chart of receiving information in accordance with a further specific implementation of the present disclosure. The method 800 can be performed at a terminal device, for example UE, or other like terminal devices. It shall be noticed that although the example flow chart is mainly described in a case that the MIB/SIB/Paging message are transmitted with the DRS in the two adjacent subframes and the DRS and the MIB are divided into the same group, it can also be combined with other cases.

As illustrated in FIG. 8, in step 801, the UE buffers the received data for the maximum possible system bandwidth, for example 20 MHz. Then in step 802, the UE blind decodes the DRS and the MIB based on the buffered data within one or more predefined bandwidths. The one or more predefined bandwidths for the DRS and the MIB can for example be defined in a specification like LTE specification, they can be the same or different for the DRS and the MIB. In step 803, if the one or more bandwidths for the SIB and paging message are predetermined, at least one of the SIB and the paging message can be decoded in further one or more predetermined bandwidths. In a case that the one or more bandwidths are indicated in any of the MIB and the DRS, the at least one of the SIB and the paging message can be decoded within further one or more bandwidths as indicated in at least one of the MIB and DRS after this information is obtained therefrom.

Hereinabove, the DRS, the MIB, the SIB, and the paging message all have the same periodicities as those of the legacy systems; however, the present disclosure is not limited thereto. In another different embodiment, the periodicities can be changed to adapt the information transmission. For example, the MIB and the SIB can be combined together as new system information so that they have the same periodicity. Moreover, the paging message may additionally share the same periodicity as the new system information combining the MIB and the SIB, which means they may have the same periodicity. The periodicity of new system information and the paging message may be same as or multiple of the DRS's periodicity.

The timing information for the DRS, the new system message and the paging message may be configured by the network node like BS, by means of RRC signaling, or are predefined in the LTE specification. They can occupy one or more subframes, which means that they can be transmitted the same one subframe or continuous subframes.

For illustration purposes, FIG. 9 schematically illustrates a block diagram of an apparatus for receiving information in a wireless communication system according to an embodiment of the present disclosure. In the illustrated figure, the periodicity of the new system information and the paging message is the same as the DRS's periodicity and they are all transmitted in the same subframe which means they have the same offset as well.

Although FIG. 9 schematically illustrates a still further example information transmission timing according to an example embodiment of the present disclosure. In FIG. 9, all of information have the same periodicity and the same time offset and transmitted in the same one subframe; however, the present disclosure it not limited thereto. In fact, it is also possible that the new system information and the paging message have a periodicity which is 2, 3, 4 times than the DRS; or the information can be grouped into different groups with different time offset, such that they can be transmitted in more than one subframes.

In addition, it is possible to change the content of the MIB/SIB/Paging message sot that they are different form the legacy ones. For example, they can be simplified from the legacy ones. In an embodiment of the present disclosure, the paging message can be simplified to indicate where UE in a group are paged or not.

FIG. 10 illustrates an example flow chart of receiving information in accordance with a still further specific implementation of the present disclosure. The method 1000 can be performed at a terminal device, for example UE, or other like terminal devices. It shall be noticed that although the example flow chart is mainly described in a case that the MIB/SIB/Paging message have the same periodicity and time offset and they are transmitted with the DRS in the same subframe, it can also be combined with other cases.

As illustrated in FIG. 10, in step 1001, the UE buffers the received data for the maximum possible system bandwidth, for example 20 MHz. Then in step 1002, the UE blind decodes the DRS based on the buffered data within one or more predefined bandwidths. The predefined bandwidth for the DRS can for example be defined in a specification like LTE specification, for example central 6RB. In step 803, if the bandwidth for the new system information and paging message is predetermined, at least one of new system information and the paging message are decoded in further one or more predetermined bandwidths based on the time/ frequency synchronization obtained from the DRS. In a case that bandwidth is indicated in the DRS, the at least one of the new system information and the paging message can be decoded within further one or more bandwidths as indicated in DRS after this information is obtained therefrom.

In FIG. 11, there is provided a flow chart of a method of receiving information in a wireless communication system according to an embodiment of the present disclosure. It shall be noticed that the methods as illustrated in FIGS. 4, 6, 8 and are specific implementation for different case and the solution as illustrated in FIG. 11 is a general solution for information receiving, which can be used for general cases of transmission timing.

In the method 1100 as illustrated in FIG. 11, the information to be received comprises at least two of a reference signal and more than one radio resource control (RRC) message. In the illustrated figure, first in step 1101, the at least two of the reference signal and the more than one RRC message are received by using a same time unit or at least two continuous time units. Particularly, the at least two of the reference signal and the more than one RRC message have a same time offset or different time offsets; the at least two of the reference signal and the more than one RRC message have a same transmission periodicity or transmission periodicities which are different multiples of a predetermined periodicity.

In an embodiment of the present disclosure, the at least two of the reference signal and the more than one RRC message may be received in the same time unit and the at least two of the reference signal and the more than one RRC message may have a same offset.

In another embodiment of the present disclosure, the at least two of the reference signal and the more than one RRC message may be grouped into at least two groups which are transmitted in the at least two continuous time units, wherein information in a same one group may have a same time offset and may have a same transmission periodicity or transmission periodicities which are different multiples of a predetermined periodicity.

In a further embodiment of the present disclosure, the UE may further decode the at least two of the reference signal and the more than one RRC message. In a further embodiment of the present disclosure, the reference signal may comprise a discovery signal (DRS) and the more than one RRC message at least comprises a master information block (MIB), a system information block (SIB) and a paging message. In such a case, the decoding may further comprise decoding the DRS within one or more predetermined bandwidths when the DRS is received; decoding the MIB within another one or more predetermined bandwidths or another one or more bandwidths as indicated in the DRS based on time/frequency synchronization information decoded from the DRS; and decoding at least one of the SIB and the paging message within further one or more predetermined bandwidths or further one or more bandwidths as indicated in at least one of the MIB and DRS.

In a still further embodiment of the present disclosure, wherein the paging information for a terminal device can be received in a time unit determined based on an identifier of the terminal device; and/or at least one of the reference signal and the more than one RRC message can be buffered before obtaining sufficient information to decode them.

In a yet further embodiment of the present disclosure, the decoding the DRS may comprise decoding the DRS to obtain an indicator about whether UE in a group is paged.

It shall be notices that the method 1100 is a general solution for the information receiving and it is based on at least those specific implementations as described in FIGS. 4,

6, 8 and 10 and thus for some detailed information about steps as illustrated in FIG. 11, one may refer to those described with reference to FIGS. 4, 6, 8 and 10.

Hereinabove, there are described methods for information transmission and receiving as proposed in the present disclosure. Besides, in the present disclosure, there is further disclosed a solution for paging messaging indication, which can be used in combination with the information transmission or receiving as proposed herein or be used with the legacy systems or other systems. As mentioned hereinabove, in the existing systems, the paging message is transmitted periodically for every UE, and is usually separately configured from DRS. The paging message carries detailed paging information so that the UE needs to decode the paging information even there is not updated information, which means a low efficiency and consumes processing resources. Thus, in the present disclosure, it is proposed to use the DRS to indicate whether UE is paged or not. In other word, the DRS may contain paging indication information.

Different UE can be allocated to different DRS time domain resources and thus the indicator in a DRS time domain position can be used to indicate whether a UE group is paged or not. In other word, it may transmit a DRS which contains an indication about whether UE is paged or not.

In an embodiment of the present disclosure, it may reuse duplexing mode indicator in the DRS to indicate whether a UE is paged or not. In the DRS, it usually comprises a duplexing mode indicator, e.g., the FDD/TDD indicator, this indicator can be reused to indicate whether UE is paging or not.

In another embodiment of the present disclosure, it is possible to reuse a cyclic prefix type indicator in the DRS to indicate whether a UE is paged or not. In the DRS, it usually, comprises a cyclic prefix type indicator, e.g., normal CP/extended CP indicator, this indicator can be reused to indicate whether UE is paging or not as well.

In a further embodiment of the present disclosure, it can reuse a specific cell index in DRS to indicate whether UE is paged or not. Every cell has a cell id which can be used to indicate that UE is paged or not. For example, cell id 504 is used as the specific cell id to indicate paging information. When UE receive DRS indicating cell id other than 504, it interprets it as a real cell id. When UE receives a DRS indicating cell id 504 in current time instance and it receives a cell id x (where x is not 504) in previous nearest time instance, it interprets this cell id x as a valid cell, and meanwhile it learns that the UE is paged.

In a still further embodiment of the present disclosure, a change of a specific indicator can also be used to indicate the UE is paged or not. For example, a UE's paging cycle is 360 ms, and the paging offset is 0, if the DRS in subframe 0 indicates a normal CP, and in subframe 360 it indicates extended CP, then the UE know that it is paged. Besides, other indicator can also be selected as the specific indicator and the change of the indicator can be used to indicate whether UE is paged or not.

In such a way, the paging indication can be implemented in a simple manner, and a single channel access opportunity is enough for DRS and paging information.

Besides, in the present disclosure, there are also provided apparatuses for information transmission and receiving in a wireless communication system, which will be described next with reference to FIGS. 12 and 13.

Figure 12:
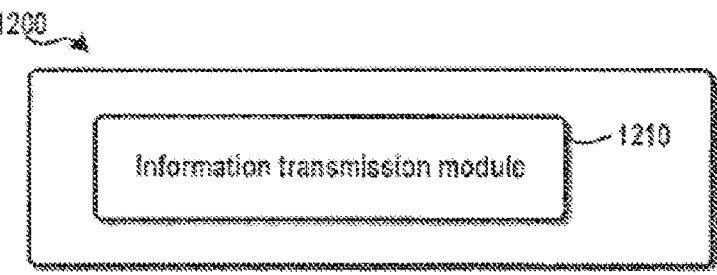
FIG. 12 schematically illustrates a block diagram of an apparatus for transmitting information in a wireless communication system according to an embodiment of the present disclosure.

FIG. 12 illustrates a block diagram of an apparatus for transmitting information in a wireless communication system according to an embodiment of the present disclosure.

In the embodiment as illustrated in FIG. 12, the information comprises at least two of a reference signal and more than one radio resource control (RRC) message. As illustrated in FIG. 12, the apparatus 1200 comprises an information transmission module 1201. The information transmission module may be configured to transmit the at least two of the reference signal and the more than one RRC message by using a same time unit or at least two continuous time units. Particularly, the at least two of the reference signal and the more than one RRC message have a same time offset or different time offsets, and the at least two of the reference signal and the more than one RRC message have a same transmission periodicity or transmission periodicities which are different multiples of a predetermined periodicity.

In an embodiment of the present disclosure, the at least two of the reference signal and the more than one RRC message may be transmitted in the same time unit and the at least two of the reference signal and the more than one RRC message have a same offset.

In another embodiment of the present disclosure, a periodicity of paging message may be larger than that of the reference signal so that paging messages for different UE can be carried at different reference signal time units, and wherein different reference signal time units can be assigned to different UE for carrying paging messages based on the UE's identifiers.

In a further embodiment of the present disclosure, the at least two of the at least two of the reference signal and the more than one RRC message may be grouped into at least two groups which are transmitted in the at least two continuous time units, wherein information in a same one group may have a same time offset and may have a same transmission periodicity or transmission periodicities which are different multiples of a predetermined periodicity.

In a still further embodiment of the present disclosure, the more than one RRC message may comprise a master information block (MIB), a system information block (SIB) and a paging message, and an indication for bandwidth of the SIB and the paging message may be carried in at least one of the MIB and the reference signal or the bandwidth is one or more predetermined bandwidths; and/or wherein the at least two of the reference signal and the more than one RRC message may have different time offsets for different cells.

In a yet further embodiment of the present disclosure, the reference signal may contain an indicator to indicate whether UE in a group is paged.

Figure 13:
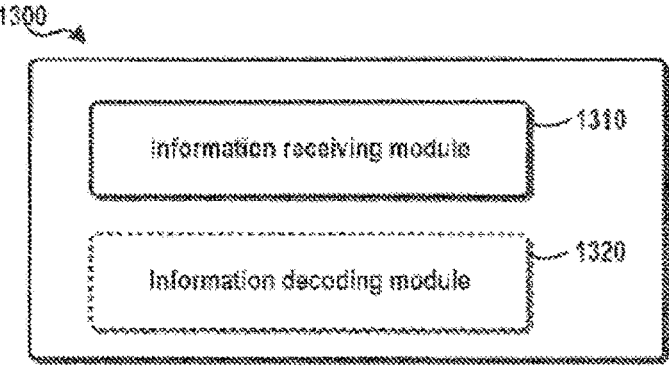
FIG. 13 schematically illustrates a block diagram of an apparatus for receiving information in a wireless communication system according to an embodiment of the present disclosure.

FIG. 13 schematically illustrates a block diagram of an apparatus for receiving information in a wireless communication system according to an embodiment of the present disclosure. In the embodiment as illustrated in FIG. 13, the information comprises at least two of a reference signal and more than one radio resource control (RRC) message. As illustrated in FIG. 13, the apparatus 1300 comprises an information receiving module 1301, configured to receive the at least two of the reference signal and the more than one RRC message by using a same time unit or at least two continuous time units. Particularly, the at least two of the reference signal and the more than one RRC message may have a same time offset or different time offsets, and wherein the at least two of the reference signal and the more than one RRC message may have a same transmission periodicity or transmission periodicities which are different multiples of a predetermined periodicity.

In an embodiment of the present disclosure, the at least two of the reference signal and the more than one RRC message may be received in the same time unit and the at least two of the reference signal and the more than one RRC message may have a same offset.

In another embodiment of the present disclosure, the at least two of the reference signal and the more than one RRC message may be grouped into at least two groups which are transmitted in the at least two continuous time units, wherein information in a same one group may have a same time offset and may have a same transmission periodicity or transmission periodicities which are different multiples of a predetermined periodicity.

In a further embodiment of the present disclosure, the reference signal may comprise a discovery signal (DRS) and wherein the more than one RRC message may at least comprise a master information block (MIB), a system information block (SIB) and a paging message. The apparatus 1300 may further comprise an information decoding module 1320. The information decoding module 1320 can be configured to: decode the DRS within one or more predetermined bandwidths when the DRS is received; decode the MIB within another one or more predetermined bandwidths or another one or more bandwidths as indicated in the DRS based on time/frequency synchronization information decoded from the DRS; and decode the SIB and the paging message within further one or more predetermined bandwidths or further one or more bandwidths as indicated in at least one of the MIB and the DRS.

In a still further embodiment of the present disclosure, the information receiving module 1310 may be further configured to perform at least one of: receiving the paging information for a terminal device in a time unit determined based on an identifier of the terminal device; and buffering at least one of the reference signal and the more than one RRC message before obtaining sufficient information to decode them.

In a yet further embodiment of the present disclosure, the information decoding module 1320 may be further configured to decode the DRS to obtain an indicator about whether UE in a group is paged.

Hereinbefore, the apparatuses 1200 and 1300 are described with reference to FIGS. 12 and 13. It is noted that the apparatuses 1200 and 1300 may be configured to implement functionalities as described with reference to FIGS. 1 to 11. Therefore, for details about the operations of modules in these apparatuses, one may refer to those descriptions made with respect to the respective steps of the methods with reference to FIGS. 1 to 11.

It is further noted that the components of the apparatuses 1200 and 1300 may be embodied in hardware, software, firmware, and/or any combination thereof. For example, the components of apparatuses 1200 and 1300 may be respectively implemented by a circuit, a processor or any other appropriate selection device. Those skilled in the art will appreciate that the aforesaid examples are only for illustration not limitation and the present disclosure is not limited thereto; one can readily conceive many variations, additions, deletions and modifications from the teaching provided herein and all these variations, additions, deletions and modifications fall the protection scope of the present disclosure.

In some embodiment of the present disclosure, apparatuses 1200 and 1300 may comprise at least one processor. The at least one processor suitable for use with embodiments of the present disclosure may include, by way of example, both general and special purpose processors already known or developed in the future. Apparatuses 1200 and 1300 may further comprise at least one memory. The at least one memory may include, for example, semiconductor memory devices, e.g., RAM, ROM, EPROM, EEPROM, and flash memory devices. The at least one memory may be used to store program of computer executable instructions. The program can be written in any high-level and/or low-level compliable or interpretable programming languages. In accordance with embodiments, the computer executable instructions may be configured, with the at least one processor, to cause apparatuses 1200 and 1300 to at least perform operations according to the method as discussed with reference to FIGS. 1 to 11 respectively.

It shall be appreciated that although the DRS, the MIB, the SIB and the paging message are described hereinabove, these signals are just given as examples for illustration purposes and in fact the present disclosure is not limited thereto. The idea of the present disclosure can also be applied in any other reference signals like CRS, CSI-RS, PSS, SSS, etc., and any other RRC messages like RRC information elements, security control information elements, mobility control information elements, measurement information elements, other information elements, MBMS information elements, SC-PTM information elements, sidelink information elements, and other RRC messages newly defined in the future.

While the description is described with reference to two continuous time units, the present disclosure is not limited thereto, it is also possible to use more continuous time unit to transmit these signals.

While the present disclosure is mainly described with unlicensed spectrums and offer a great benefit thereto, the present disclosure is not limited only to the unlicensed spectrums but can be applied normal communication and provide benefit of reduced interferences.

In addition, in a further aspect of the present disclosure, there is further provided a method for reference signal transmission. The method comprises transmitting a reference signal containing an indicator to indicate whether UE in a group is paged. In an embodiment of the present disclosure, the reference signal at least comprises a discovery signal (DRS). In a further embodiment of the present disclosure, whether the UE in a group is paged is indicated by any of: reusing duplexing mode indicator in the DRS; reusing a cyclic prefix type indicator in the DRS; reusing a specific cell index in DRS; using a change of a specific indicator in DRS.

In a still further aspect of the present disclosure, there is provided an apparatus for reference signal transmission. The apparatus may comprise a reference signal transmission unit configured to transmit a reference signal containing an indicator to indicate whether UE in a group is paged. In an embodiment of the present disclosure, the reference signal at least comprises a discovery signal (DRS). In a further embodiment of the present disclosure, whether the UE in a group is paged is indicated by any of: reusing duplexing mode indicator in the DRS; reusing a cyclic prefix type indicator in the DRS; reusing a specific cell index in DRS; using a change of a specific indicator in DRS.

Figure 14:
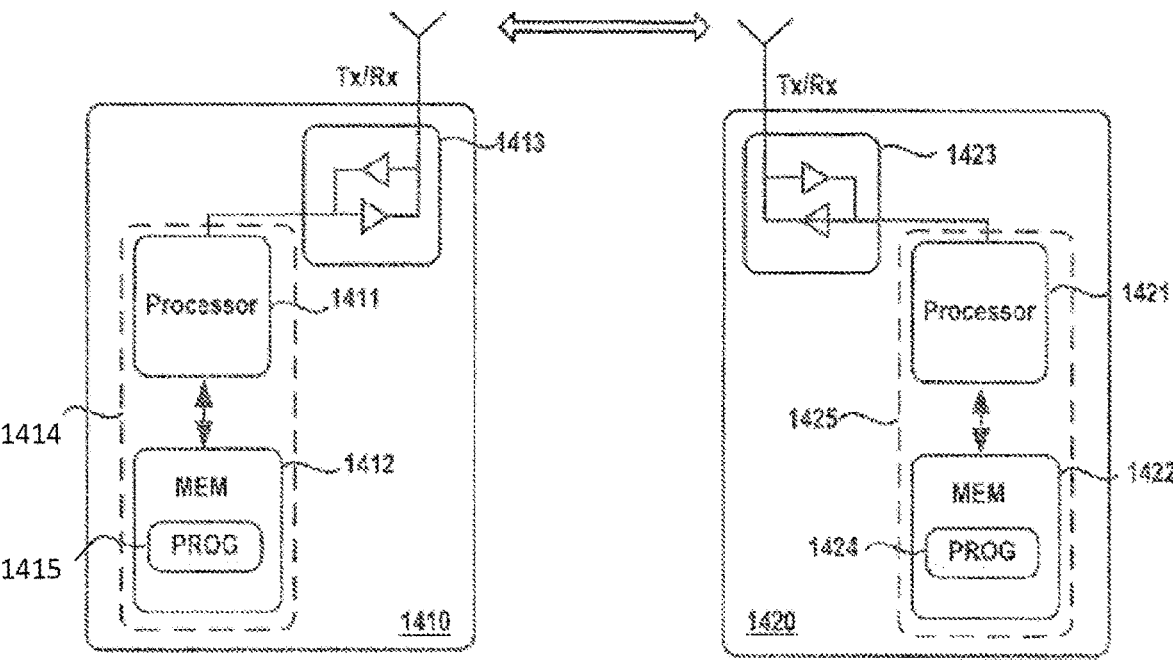
FIG. 14 further illustrates a simplified block diagram of an apparatus 1410 that may be embodied as or comprised in UE and an apparatus 1420 that may be embodied as or comprised in a base station in a wireless network as described herein.
Figure 15:
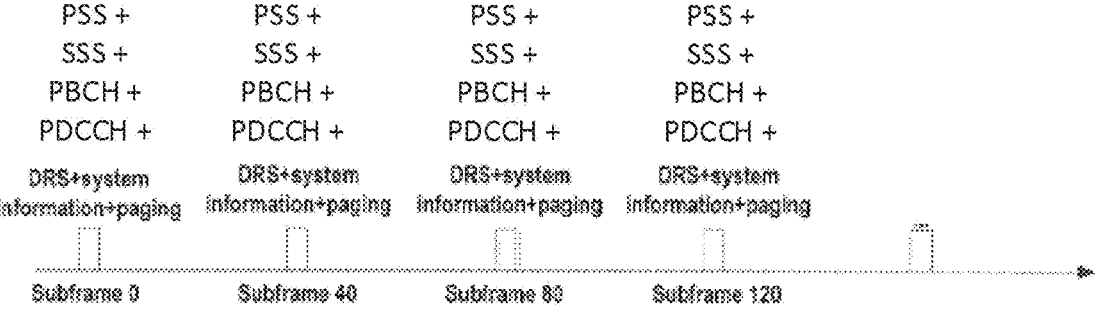
FIG. 15 illustrates a still further example information transmission timing according to an example embodiment of the present disclosure.

FIG. 14 further illustrates a simplified block diagram of an apparatus 1410 that may be embodied as or comprised in a terminal device such as UE in a wireless network and an apparatus 1420 that may be embodied as or comprised in a base station such as NB or eNB as described herein.

The apparatus 1410 comprises at least one processor 1411, such as a data processor (DP) and at least one memory (MEM) 1412 coupled to the processor 1411. The apparatus 1410 may further comprise a transmitter TX and receiver RX 1413 coupled to the processor 1411, which may be operable to communicatively connect to the apparatus 1420.

The MEM 1412 stores a program (PROG) 1414. The PROG 1414 may include instructions that, when executed on the associated processor 1411, enable the apparatus 1410 to operate in accordance with embodiments of the present disclosure for example to perform any the methods 400, 600, 800, and 1100. A combination of the at least one processor 1411 and the at least one MEM 1412 may form processing means 1415 adapted to implement various embodiments of the present disclosure.

The apparatus 1420 comprises at least one processor 1421, such as a DP, and at least one MEM 1422 coupled to the processor 1421. The apparatus 1420 may further comprise a suitable TX/RX 1423 coupled to the processor 1421, which may be operable for wireless communication with the apparatus 1410. The MEM 1422 stores a PROG 1424. The PROG 1424 may include instructions that, when executed on the associated processor 1421, enable the apparatus 1420 to operate in accordance with the embodiments of the present disclosure, for example to perform the method 100. A combination of the at least one processor 1421 and the at least one MEM 1422 may form processing means 1425 adapted to implement various embodiments of the present disclosure.

Various embodiments of the present disclosure may be implemented by computer program executable by one or more of the processors 1411, 1421, software, firmware, hardware or in a combination thereof.

The MEMs 1412 and 1422 may be of any type suitable to the local technical environment and may be implemented using any suitable data storage technology, such as semiconductor based memory devices, magnetic memory devices and systems, optical memory devices and systems, fixed memory and removable memory, as non-limiting examples.

The processors 1411 and 1421 may be of any type suitable to the local technical environment, and may include one or more of general purpose computers, special purpose computers, microprocessors, digital signal processors DSPs and processors based on multicore processor architecture, as non-limiting examples.

In addition, the present disclosure may also provide a carrier containing the computer program as mentioned above, wherein the carrier is one of an electronic signal, optical signal, radio signal, or computer readable storage medium. The computer readable storage medium can be, for example, an optical compact disk or an electronic memory device like a RAM (random access memory), a ROM (read only memory), Flash memory, magnetic tape, CD-ROM, DVD, Blue-ray disc and the like.

The techniques described herein may be implemented by various means so that an apparatus implementing one or more functions of a corresponding apparatus described with one embodiment comprises not only prior art means, but also means for implementing the one or more functions of the corresponding apparatus described with the embodiment and it may comprise separate means for each separate function, or means that may be configured to perform two or more functions. For example, these techniques may be implemented in hardware (one or more apparatuses), firmware (one or more apparatuses), software (one or more modules), or combinations thereof. For a firmware or software, implementation may be made through modules (e.g., procedures, functions, and so on) that perform the functions described herein.

Exemplary embodiments herein have been described above with reference to block diagrams and flowchart illustrations of methods and apparatuses. It will be understood that each block of the block diagrams and flowchart illustrations, and combinations of blocks in the block diagrams and flowchart illustrations, respectively, can be implemented by various means including computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

While this specification contains many specific implementation details, these should not be construed as limitations on the scope of any implementation or of what may be claimed, but rather as descriptions of features that may be specific to particular embodiments of particular implementations. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

It will be obvious to a person skilled in the art that, as the technology advances, the inventive concept can be implemented in various ways. The above described embodiments are given for describing rather than limiting the disclosure, and it is to be understood that modifications and variations may be resorted to without departing from the spirit and scope of the disclosure as those skilled in the art readily understand. Such modifications and variations are considered to be within the scope of the disclosure and the appended claims. The protection scope of the disclosure is defined by the accompanying claims.

What is claimed is:

1. A method performed by a terminal device, the method comprising:
    receiving, from a network device, a primary synchronization signal (PSS), a secondary synchronization signal (SSS), and a physical broadcast channel (PBCH) with a first periodicity;
receiving a paging message with a second periodicity; and
receiving, a system information block (SIB) with a third periodicity,
wherein the second periodicity is two or four times as long as the first periodicity and the third periodicity is as long as the first periodicity in a first case, and
wherein the first periodicity, the second periodicity, and the third periodicity are identical in a second case.

2. The method of claim 1, wherein the PBCH comprises a master information block (MIB).

3. The method of claim 1, wherein the SIB is transmitted in a physical downlink shared channel (PDSCH).

4. The method of claim 1, wherein the PSS and the SSS comprise an indicator about whether a user equipment (UE) in a group is paged.

5. A terminal device, comprising:
a processor configured to:
    receive, from a network device, a primary synchronization signal (PSS), a secondary synchronization signal (SSS), and a physical broadcast channel (PBCH) with a first periodicity;
    receive a paging message with a second periodicity; and
    receive, a system information block (SIB) with a third periodicity,
    wherein the second periodicity is two or four times as long as the first periodicity and the third periodicity is as long as the first periodicity in a first case, and
    wherein the first periodicity, the second periodicity, and the third periodicity are identical in a second case.

6. The terminal device of claim 5, wherein the PBCH comprises a master information block (MIB).

7. The terminal device of claim 5, wherein the SIB is transmitted in a physical downlink shared channel (PDSCH).

8. The terminal device of claim 5, wherein the PSS and the SSS comprise an indicator about whether a terminal device in a group is paged.

* * * * *